(12) United States Patent
Ramachandran et al.

(10) Patent No.: US 6,353,303 B1
(45) Date of Patent: Mar. 5, 2002

(54) CONTROL ALGORITHM FOR INDUCTION MOTOR/BLOWER SYSTEM

(75) Inventors: Parimelalagan Ramachandran, Ozark; Vincent C. Ciardo, Springfield, both of MO (US)

(73) Assignee: Fasco Industries, Inc., Ozark, MO (US)

( * ) Notice: Subject to any disclaimer, the term of this patent is extended or adjusted under 35 U.S.C. 154(b) by 0 days.

(21) Appl. No.: 09/691,342

(22) Filed: Oct. 18, 2000

Related U.S. Application Data

(60) Provisional application No. 60/160,377, filed on Oct. 19, 1999.

(51) Int. Cl.$^7$ ................................................. H02P 7/36
(52) U.S. Cl. .................... 318/727; 318/432; 318/806; 318/807; 318/808; 417/42; 454/229; 454/236
(58) Field of Search ............................... 318/432, 727, 318/807, 806, 808; 454/229, 236; 417/42

(56) References Cited

U.S. PATENT DOCUMENTS

| | | | |
|---|---|---|---|
| 4,311,951 A | * | 1/1982 | Walker et al. ............... 318/778 |
| 4,726,738 A | * | 2/1988 | Nakamura et al. ............. 417/22 |
| 4,767,976 A | * | 8/1988 | Mutoh et al. ................ 318/808 |
| 4,992,715 A | * | 2/1991 | Nakamura et al. ........... 318/649 |
| 5,447,414 A | * | 9/1995 | Nordby et al. ................. 417/20 |
| 5,509,788 A | * | 4/1996 | Livington et al. ............. 417/43 |
| 6,227,961 B1 | * | 5/2001 | Moore et al. ................ 454/229 |

\* cited by examiner

Primary Examiner—Robert E. Nappi
Assistant Examiner—Rita Leykin
(74) Attorney, Agent, or Firm—Jonathan A. Bay

(57) ABSTRACT

An apparatus and method for controlling an induction motor having a variable frequency drive in a blower system so that the blower system provides a specific fluid flow. A start-up program causes the motor to ramp up to approximately a predetermined steady state speed. A required blower torque is calculated by operating on a table of blower constants, a selected flow rate and a motor speed which is read from a speed sensor in the motor/blower system. A developed motor torque is calculated by operating on a table of motor specific constants, a voltage-frequency index and the motor speed taken from the speed sensor. The calculated required blower torque is repeatedly compared with the calculated developed motor torque. The voltage-frequency index to the variable frequency drive is modified to force the developed motor torque to converge with the required blower torque in a steady state.

20 Claims, 1 Drawing Sheet

CONTROL ALGORITHM FOR INDUCTION MOTOR/BLOWER SYSTEM

CROSS-REFERENCE TO PROVISIONAL APPLICATIONS(s)

This application claims the benefit of U.S. Provisional Application No. 60/160,377, filed Oct. 19, 1999.

BACKGROUND OF THE INVENTION

The invention relates to a motor controller and more particularly to a motor controller for driving a fluid impeller and still more particularly to a motor controller for driving a fluid impeller to provide a specific fluid flow rate.

It is known to employ electric motors to drive fluid impellers such as fan blades or blower cages in air moving apparatus. Such apparatus are typically used in heating, ventilation and air conditioning applications.

It is further known that heating, ventilation and air conditioning systems require a constant fluid flow in order to operate efficiently. Fluid resistance in the ducting of such systems typically varies with time as a result of various in fluid paths and duct openings. For example, every adjustment of a ventilation opening causes a fluid resistance change in the ducting.

It is known that blower torque must be adjusted to compensate for variable fluid resistance if constant fluid flow is to be maintained.

Various methods and apparatus are known to adjust blower torque in response to variations in fluid resistance or load. Typically, fluid flow may be measured directly by fluid flow transducers which are immersed in the fluid flow path. An electrical signal is typically fed back from the transducers to a microprocessor system or an electric circuit which is designed to adjust the speed of a blower motor to approach a predetermined constant value. Such systems are often too expensive or comprise components that are too large for use in practical heating, ventilation and air conditioning applications.

It is known that the magnitudes of a phase current in a blower motor drive circuit is related to the magnitude of fluid flow which is impelled by the blower. It is further known to provide a constant fluid flow by comparing a measured phase current of a blower motor drive circuit with an empirically determined ideal reference phase current for a specific constant fluid flow to determine an error phase current signal. The empirically determined reference phase current value is typically stored in a look-up table in the memory of a microprocessor system. It is further known to manipulate an error phase current signal so that it is suitable for input as an index to a pulse width modulator in a motor control circuit wherein the motor control circuit is caused to change motor speed to reduce the error phase current signal. The error phase current signal is reduced as the measured motor current approaches the ideal constant flow reference phase current.

Such methods may provide imprecise flow control because phase currents are known to fluctuate and are typically noisy. Furthermore such methods require added cost because they require current measurement feedback loops.

It is desirable to provide a constant fluid flow motor controller of reduced complexity by means not requiring direct measurement of fluid flow rate or motor current nor requiring any dedicated feedback sensor components.

SUMMARY OF THE INVENTION

Accordingly, the invention provides a specific fluid flow motor controller by employing a theoretically derived algorithm to operate on critical motor parameters internal to a variable frequency drive.

The algorithm of the invention employs an at least second-order polynomial equation, for describing blower torque, as follows:

$$T_b = A_{2F} N_b^2 + A_{1F} N_b + A_{0F} \quad (1)$$

wherein $T_b$ is the torque required by the blower at speed $N_b$ to deliver a specific flow rate and $A_{2F}$, $A_{1F}$ and $A_{0F}$ are specific blower constants of proportionality for the required flow rate F.

Equation (1) characterizes the steady-state control relationship between the blower speed $N_b$ and the required blower torque to deliver the desired rate of fluid flow. The set of constants of proportionality $A_{2F}$, $A_{1F}$ and $A_{0F}$ are deduced uniquely for each blower design. The size of the constant set for varying F is chosen appropriately to meet the required range of flow control.

The algorithm of the invention further employs another at least second-order polynomial equation for describing motor torque as follows:

$$T_m = B_{2R} N_m^2 + B_{1R} N_m + B_{0R} \quad (2)$$

wherein $T_m$ is the torque produced by the induction motor at a speed $N_m$ while operating with a specific voltage-frequency index R and $B_{2R}$, $B_{1R}$ and $B_{0R}$ are specific motor constants of proportionality for the voltage-frequency index R.

Equation (2) characterizes the steady control relationship between an induction motor speed $N_m$ and the developed motor torque for the operating voltage-frequency index. The set of constants or proportionality $B_{2R}$, $B_{1R}$ and $B_{0R}$ are deduced uniquely for each induction motor and drive control electronics design to be used. The size of the constant for varying R set is chosen to meet the required fineness of control.

The invention employs a microprocessor system to implement a steady state control algorithm and a transient control algorithm. The transient control algorithm comprises a start-up procedure which controls the motor/blower system until it approaches a steady state condition. Under steady state conditions, $T_b = T_m$ if $N_b = N_m = N$ as when the motor is directly attached to the blower. Otherwise, the product of the motor torque-speed equals the product of blower torque speed.

When the control system is started it executes the transient control algorithm for a start-up period. During the start-up period the microprocessor system changes the voltage-frequency index of the controller to cause the motor speed to ramp up from rest or zero rotations per minute to a desired steady state speed. The microprocessor system computes the speed value numerically by manipulating an output signal from a speed sensor in the induction motor/blower system. After the start-up period, the microprocessor system executes the steady state control algorithm. The start-up period is chosen based upon the rotational inertia of the particular motor/blower system so that the speed will reach the desired steady state value before the end of the start up period.

While executing the steady state control algorithm, the microprocessor system calculates the required blower torque $T_b$ using equation (1). The microprocessor system reads a user input, typically a selector switch bank, which provides a desired fluid flow rate signal (ie., an input value for F) and selects the matching constants $A_{2F}$, $A_{1F}$, and $A_{0F}$ from memory. The microprocessor system computes the motor speed by manipulating the output of the speed sensor. The microprocessor system calculates the required blower torque using equation (1) to operate on the selected flow constants and actual motor speed.

While executing the steady state control algorithm, the microprocessor system also calculates the developed motor torque $T_m$ by using equation (2). The motor speed is taken from the speed sensor and the motor constants $B_{2R}$, $B_{1R}$ and $B_{0R}$ are read from memory as a function of the operating voltage-frequency index.

While executing the steady state algorithm the microprocessor system compares the computed values of $T_b$ and $T_m$ and adjusts the voltage-frequency index to force $T_b$ and $T_m$ to converge. If $T_b=T_m$ the microprocessor system makes no changes to the voltage-frequency index. If $T_b>T_m$ the microprocessor system modifies the voltage-frequency index to cause $T_m$ to increase. If $T_b<T_m$ the microprocessor system modifies the voltage-frequency index to cause $T_m$ to decrease. The microprocessor system waits for a settle time after each modification of the voltage-frequency index wherein the settle time is determined by the motor/blower system rotational inertia. The microprocessor system continuously repeats the steps of the steady state algorithm.

Again, the foregoing assumes the motor speed equals blower speed. The foregoing also that the main supply voltage is constant. However, the algorithm may optionally apply corrections for either, including for supply voltage variation where improved flow control resolution is required.

It is an advantage of the invention to provide a specific fluid flow rate without the need for any motor current sensor or motor current feedback.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, the sole FIGURE is a block diagram view of a motor/blower system having an inverter fed induction motor drive, wherein the motor/blower system utilizes a control algorithm in accordance with the invention which in response to a motor speed sensor input signal provides a voltage-frequency index output signal to a variable frequency motor drive to adjust motor speed.

DETAILED DESCRIPTION OF THE PREFERRED EMBODIMENTS

Figure 1:
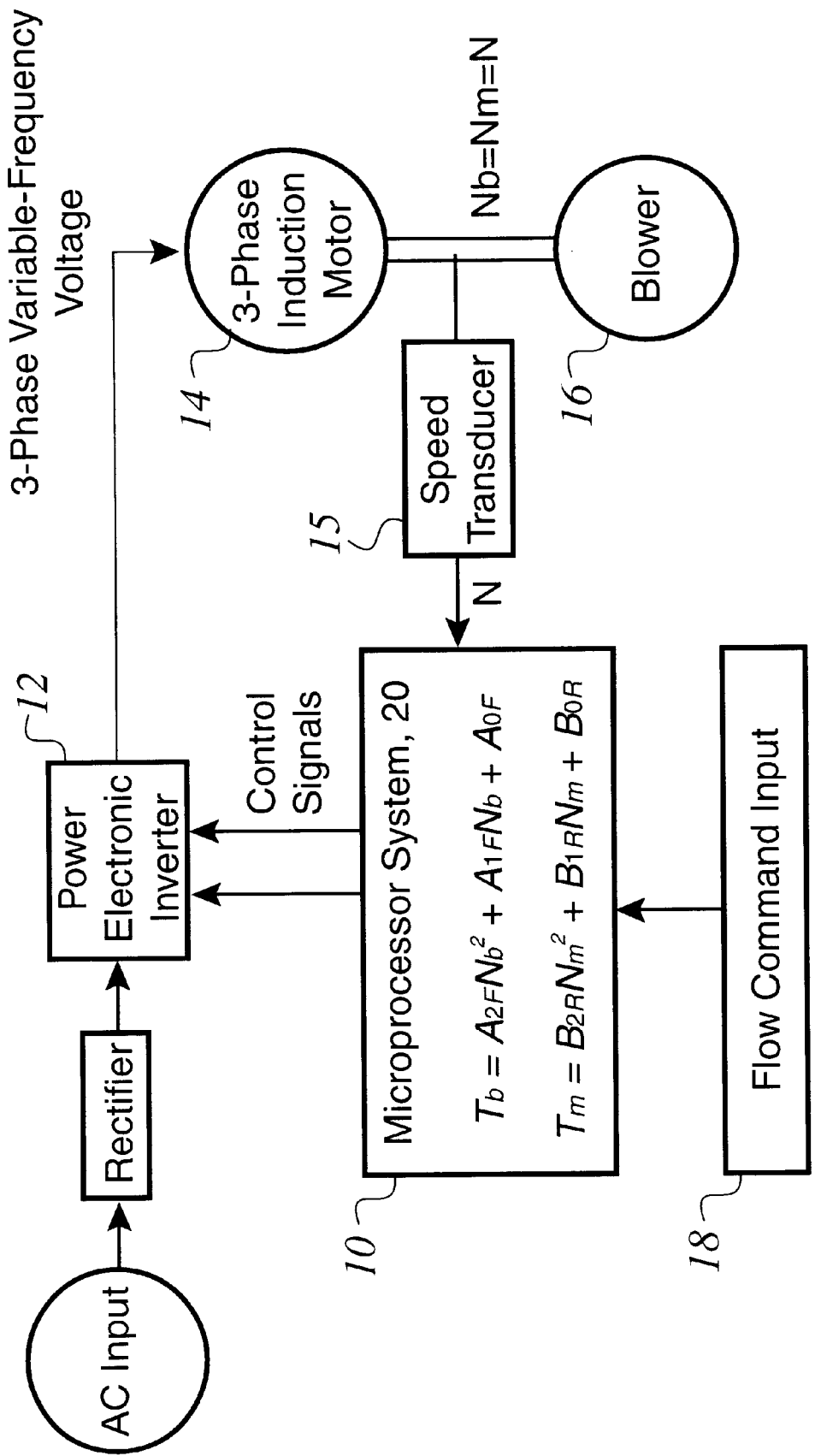

With reference to the FIGURE, the specific flow motor controller 10 of the invention comprises means 15 for detecting a signal from a speed sensor in an induction motor 14 in communication with means for signal manipulation 20, preferably a microprocessor system or digital signal processor, means 18 for producing an electrical signal ("selector means") to represent a specific fluid flow rate, preferably a switch bank, in communication with the manipulation means, and memory means to store electrical signals which represent a plurality of numeric constant values. The manipulation means is in electrical communication with a variable frequency drive 12 wherein the manipulation means is capable of modifying a voltage frequency index to the variable frequency drive. This changes the speed of the motor 14 which changes the speed of the blower 16.

The control circuitry (eg., the 'manipulation means') preferably comprises a microdevice processing unit such as a microprocessor or micro-controller or the like, or else an integrated product like a digital signal processor. Generally, a microprocessor comprises a general use instruction code execution device. In distinction, a micro-controller is more of a specific use device, perhaps characterized by having a simplified instruction set and being designed to work with smaller address space than other microprocessors. These simplifications plus others that realize various input-output services that would otherwise be realized on separate chips, have the effect of reducing the total parts cost in a microcontroller system, an important consideration if the micro-device is to be designed into a manufactured product for which cost containment is paramount.

Whereas nowadays high-end micro-devices have 32-bit, 64-bit and beyond registers, there remains ample applications for highly economical 8-bit micro-devices, again especially in cases where cost is paramount. Some of the more popular 8-bit microprocessors and micro-controllers include those products of Intel and Motorola such as the Intel 8080 or Motorola's MC6800, MC6805 and/or MC68HC11. An example digital signal processor would include Texas Instrument's popular 16-bit digital signal processor, model no. TMS32024X.

Briefly, the invention involves some of the following highlights. The manipulation means executes program steps which change the voltage-frequency index of the variable frequency drive to cause a motor/blower rotational speed to ramp up from zero rotations per minute to a predetermined steady state speed within a predetermined start-up time. The steady state speed and start-up time are determined according to the rotational inertia of the particular motor/blower system and the required speed range.

An array of specific blower constant values, $A_{2F}$, $A_{1F}$ and $A_{0F}$ are stored in memory wherein a specific flow rate F serves as an index to reference the proper set of constants from the array. The specific flow rate F is determined by a selection from a selector means of a value for which the selector means provides a corresponding electrical signal. The manipulation means reads an input signal from the speed sensor to determine a motor rotational speed $N_m$ which also determines the equal blower rotational speed $N_b$. In a simple case the motor speed equals the blower speed. The manipulation means processes the selected blower constant values $A_{2F}$, $A_{1F}$ and $A_{0F}$ together with the blower rotational speed to determine the required steady state blower torque $T_b$, as described by at least a second-order polynomial equation as follows:

$$T_b = A_{2F} N_b^2 + A_{1F} N_b + A_{0F}.$$

An array of specific motor constant values $B_{2R}$, $B_{1R}$ and $B_{0R}$ are stored in memory wherein a specific voltage-frequency index R serves as an index to reference the proper set of constants from the array. The manipulation means reads the voltage-frequency index R from the variable frequency drive. The manipulation means processes the appropriate motor constant values $B_{2R}$, $B_{1R}$ and $B_{0R}$ together with the motor rotational speed $N_m$ to determine the steady state motor torque $T_m$ as described by another at least a second-order polynomial equation as follows:

$$T_m = B_{2R} N_m^2 + B_{1R} N_m + B_{0R}.$$

The manipulation means compares the computed values of $T_b$ and $T_m$ and adjusts the voltage-frequency index to force $T_b$ and $T_m$ to converge. If $T_b=T_m$ the manipulation means makes no changes to the voltage-frequency index. If $T_b>T_m$ the manipulation means modifies the voltage-frequency index to cause $T_m$ to increase. If $T_b<T_m$ the manipulation means modifies the voltage-frequency index to cause $T_m$ to decrease.

The manipulation means waits for a settle time after each modification of the voltage-frequency index wherein the settle time is determined by the motor/blower system rotational inertia. The manipulation means continuously repeats the steps of comparing $T_b$ to $T_m$ and causing the two results to converge by the modifying the voltage-frequency index.

The foregoing includes assumptions including that motor speed equals blower speed. The following more particularly describes aspects of the invention when that is not necessarily true.

A control apparatus is provided for controlling flow output of an induction motor/blower system. The induction motor/blower system has an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m/N_b$) is known.

The control apparatus comprises a data processor and a motor drive, operably coupled to the data processor, which adjusts motor speed $N_m$ in response to control signals from the data processor corresponding to a voltage-frequency index R.

A device is provided for serving the data processor information corresponding to flow command information F. Another device is provided for serving the data processor information corresponding to one of rotor speed $N_m$ or impeller speed $N_b$.

The data processor is operational to achieve the following:

fetch the most recent voltage-frequency index R, the flow command information F, and the known ratio $N_m/N_b$ from either storage or inputs;

solve for the other of impeller speed $N_b$ or rotor speed $N_m$;

solve for required blower torque $T_b$ by a polynomial equation expanded through at least second order terms and such that the blower-torque equation's coefficients vary with the flow command information F according to:

$$T_b = A_{0F} + A_{1F}N_b + A_{2F}N_b^2 + \ldots,$$

including extracting the blower-torque equation's coefficients $A_{0F}, A_{1F}, A_{2F} \ldots$, from storage according to the flow command value F;

solve for delivered motor torque $T_m$ by another polynomial equation expanded through at least second order terms and such that the motor-torque equation's coefficients vary with the most recent voltage-frequency index R according to:

$$T_m = B_{0R} + B_{1R}N_m + B_{2R}N_m^2 + \ldots,$$

including extracting the motor-torque equation's coefficients $B_{0R}, B_{1R}, B_2 \ldots$, from storage according to the most recent voltage-frequency index R;

compare, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and, in any case, respond to inequality by signaling the motor drive with a succeeding most recent voltage-frequency index R which is modified to adjust the motor speed correspondingly.

The data process is preferably further operational to idle for a pre-determined settling time after the activities of compare and respond (if any response), by repeating all over. The data processor includes optional circuitry incorporating one of a micro-processor, a micro-data processor, or a digital signal processor.

The activity of 'responding' as following the activity of 'comparing,' in cases of the ratio $N_m/N_b$ being substantially unity, the required blower-torque (required-$T_b$) to the delivered motor-torque (delivered-$T_m$), further comprises:

not modifying the most recent voltage-frequency index R if the required blower-torque (required-$T_b$) is substantially the same as the delivered motor-torque (delivered-$T_m$);

increasing the most recent voltage-frequency index R by a given increment if the required blower-torque (required-$T_b$) is not substantially the same as and is greater than the delivered motor-torque (delivered-$T_m$); and decreasing the most recent voltage-frequency index R by a given decrement if the required blower-torque (required-$T_b$) is not substantially the same as and is less than the delivered motor-torque (delivered-$T_m$).

Alternatively, the activity of 'responding' as following the activity of 'comparing' the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the product of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered-$T_m \times N_m$).

The voltage-frequency index comprises a normalized ratio of voltage to frequency (V/f) that either is linear such as when an arbitrarily chosen index value of unity®=1) corresponds to 100 V per 50 hertz and then the ratio of 200 V per 100 hertz corresponds to R=2, or is non-linear as when an arbitrarily chosen index value of unity®=1) corresponds to 100 V per 50 hertz and then the ratio of 200 V per 90 hertz corresponds to R=2.

The device serving the controller information corresponding to flow command information F optionally comprises either a device receiving the flow command information F from an input device or extracting it from a database. The other device serving the controller information corresponding to one of rotor speed $N_m$ or impeller speed $N_b$ further preferably comprises providing either the motor or the blower with a speed transducer.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method having an automatic controller of an induction motor/blower system providing a specified flow output, comprising the steps of:

providing an induction motor/blower system having an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m/N_b$) is known;

providing a controller linked to a motor drive that adjusts motor speed $N_m$ in response to control signals from the controller corresponding to a voltage-frequency index R;

serving the controller information corresponding to flow command information F;

serving the controller information corresponding to one of rotor speed $N_m$ or impeller speed $N_b$ and solving for the other of impeller speed $N_b$ or rotor speed $N_m$ by the known ratio $N_m/N_b$;

solving for required blower torque $T_b$ by a polynomial equation expanded through at least second order terms and such that the blower-torque equation's coefficients vary with the flow command information F according to:

$$T_b = A_{0F} + A_{1F}N_b + A_{2F}N_b^2 + \ldots,$$

including extracting the blower-torque equation's coefficients $A_{0F}, A_{1F}, A_{2F} \ldots$, from a database according to the flow command value F;

solving for delivered motor torque $T_m$ by another polynomial equation expanded through at least second order terms and such that the motor-torque equation's coefficients vary with the most recent voltage-frequency index R according to:

$$T_m = B_{0R} + B_{1R}N_m + B_{2R}N_m^2 + \ldots,$$

including extracting the motor-torque equation's coefficients $B_{0R}, B_{1R}, B_{2R} \ldots$, from a database according to the most recent voltage-frequency index R;

comparing, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and, in any case, responding to inequality by signaling the motor drive with a succeeding most recent voltage-frequency index R which is modified to adjust the motor speed correspondingly.

2. The method of claim 1 further comprising:

idling for a pre-determined settling time, and then returning to the step of serving the controller information corresponding to flow command information F, and repeating the succeeding steps.

3. The method of claim 1 wherein the step of responding as following the step of comparing, in cases of the ratio $N_m/N_b$ being substantially unity, the required blower-torque (required-$T_b$) to the delivered motor-torque (delivered-$T_m$), further comprises:

not modifying the most recent voltage-frequency index R if the required blower-torque (required-$T_b$) is substantially the same as the delivered motor-torque (delivered-$T_m$);

increasing the most recent voltage-frequency index R by a given increment if the required blower-torque (required-$T_b$) is not substantially the same as and is greater than the delivered motor-torque (delivered-$T_m$); and decreasing the most recent voltage-frequency index R by a given decrement if the required blower-torque (required-$T_b$) is not substantially the same as and is less than the delivered motor-torque (delivered-$T_m$).

4. The method of claim 1 wherein the step of responding as following the step of comparing the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the product of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered-$T_m \times N_m$).

5. The method of claim 1 wherein the voltage-frequency index comprises a normalized ratio of voltage to frequency (V/f) that either is linear such as when an arbitrarily chosen index value of unity(®=1) corresponds to 100 V per 50 hertz and then the ratio of 200 V per 100 hertz corresponds to R=2, or is non-linear as when an arbitrarily chosen index value of unity(®=1) corresponds to 100 V per 50 hertz and then the ratio of 200 V per 90 hertz corresponds to R=2.

6. The method of claim 1 wherein the step of serving the controller information corresponding to flow command information F further comprises:

one of receiving from an input device or extracting from a database the flow command information F.

7. The method of claim 1 wherein the step of serving the controller information corresponding to one of rotor speed $N_m$ or impeller speed $N_b$ further comprises:

providing one of the motor or the blower with a speed transducer.

8. The method of claim 1 wherein the blower has a given impeller chosen from one of a fan blade or a blower wheel.

9. Apparatus for controlling flow output of an induction motor/blower system that has an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m/N_b$) is known, said apparatus comprising:

a data processor;

a motor drive, operably coupled to the data processor, which adjusts motor speed $N_m$ in response to control signals from the data processor corresponding to a voltage-frequency index R;

a device serving the data processor information corresponding to flow command information F; and, another device serving the data processor information corresponding to one of rotor speed $N_m$ or impeller speed $N_b$;

wherein said data processor is operational to:

fetch the most recent voltage-frequency index R, the flow command information F, and the known ratio $N_m/N_b$ from either storage or inputs;

solve for the other of impeller speed $N_b$ or rotor speed $N_m$;

solve for required blower torque $T_b$ by a polynomial equation expanded through at least second order terms and such that the blower-torque equation's coefficients vary with the flow command information F according to:

$$T_b = A_{0F} + A_{1F} N_b + A_{2F} N_b^2 + \ldots,$$

including extracting the blower-torque equation's coefficients $A_{0F}, A_{1F}, A_{2F} \ldots$, from storage according to the flow command value F;

solve for delivered motor torque $T_m$ by another polynomial equation expanded through at least second order terms and such that the motor-torque equation's coefficients vary with the most recent voltage-frequency index R according to:

$$T_m = B_{0R} + B_{1R} N_m + B_{2R} N_m^2 + \ldots,$$

including extracting the motor-torque equation's coefficients $B_{0R}, B_{1R}, B_{2R} \ldots$, from storage according to the most recent voltage-frequency index R;

compare, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and, in any case, respond to inequality by signaling the motor drive with a succeeding most recent voltage-frequency index R which is modified to adjust the motor speed correspondingly.

10. The apparatus of claim 9 wherein the data processor is further operational to:

idle for a pre-determined settling time after the activities of compare and respond (if any response), and then repeating all over.

11. The apparatus of claim 9 wherein:

the data processor includes circuitry incorporating one of a micro-processor, a micro-controller, or a digital signal processor.

12. The apparatus of claim 9 wherein the activity of responding as following the activity of comparing, in cases of the ratio $N_m/N_b$ being substantially unity, the required blower-torque (required-$T_b$) to the delivered motor-torque (delivered-$T_m$), further comprises:

not modifying the most recent voltage-frequency index R if the required blower-torque (required-$T_b$) is substantially the same as the delivered motor-torque (delivered-$T_m$);

increasing the most recent voltage-frequency index R by a given increment if the required blower-torque (required-$T_b$) is not substantially the same as and is greater than the delivered motor-torque (delivered-$T_m$); and decreasing the most recent voltage-frequency index R by a given decrement if the required blower-torque (required-$T_b$) is not substantially the same as and is less than the delivered motor-torque (delivered-$T_m$).

13. The apparatus of claim 9 wherein the activity of responding as following the activity of comparing the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the product of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered-$T_m \times N_m$).

14. The apparatus of claim 9 wherein the voltage-frequency index comprises a normalized ratio of voltage to frequency (V/f) that either is linear such as when an arbitrarily chosen index value of unity®=1) corresponds to 100 V per 50 hertz and then the ratio of 200 V per 100 hertz corresponds to R=2, or is non-linear as when an arbitrarily chosen index value of unity®=1) corresponds to 100 V per 50 hertz and then the ratio of 200 V per 90 hertz corresponds to R=2.

15. The apparatus of claim 9 wherein said other device that serves the data processor information corresponding to one of rotor speed $N_m$ or impeller speed $N_b$ further comprises a speed transducer operably coupled to either the motor or the blower.

16. An apparatus for providing a constant fluid flow comprising:

an induction motor having at least one rotor, at least one speed sensor and at least one variable frequency drive;

at least one fluid impeller attached to said at least one rotor wherein said at least one fluid impeller is constrained to rotate with an annular velocity equal to an angular velocity of said at least one rotor;

means for calculating motor speed by manipulating a signal from said at least one speed sensor wherein said means for calculating a motor speed is in electrical communication with said speed sensor;

means for storing and reading electrical signals to represent specific blower constant data and specific motor constant data;

means to provide an electrical signal to represent a selected fluid flow rate;

electrical signals representing an array of specific blower constant data wherein said array is indexed by an electrical signal representing a selected fluid flow rate;

means for monitoring a voltage-frequency index of said variable frequency drive;

electrical signals representing an array of specific motor constant data wherein said array is indexed by an electrical signal representing said voltage-frequency index of said variable frequency drive;

means to calculate a required blower torque $T_b$ by reading specific blower constant data $A_{2F}, A_{1F}$ and $A_{0F}$ from memory as indexed by said electrical signal representing a selected flow rate F and manipulating said specific blower constant data together with said blower speed $N_b$ according to the equation:

$$T_b = A_{2F} N_b^2 + A_{1F} N_b + A_{0F};$$

means to calculate a developed motor torque $T_m$ by reading specific motor constant data $B_{2R}$, $B_{1R}$ and $B_{0R}$ from memory as indexed by an electrical signal representing the voltage-frequency index R of said variable frequency drive, and manipulating said specific motor constant data together with said motor speed $N_m$ according to the equation:

$$T_m = B_{2R} N_m^2 + B_{1R} N_m + B_{0R};$$

means to compare the calculated values of required blower torque $T_b$ to the calculated value of delivered motor torque $T_m$;

means to modify the voltage-frequency index of the variable frequency drive to cause the delivered motor torque $T_m$ to remain constant if $T_b = T_m$;

means to modify the voltage-frequency index of the variable frequency drive to cause the delivered motor torque $T_m$ to increase if $T_b > T_m$; and means to modify the voltage-frequency index of the variable frequency drive to cause the delivered motor torque $T_m$ to decrease if $T_b < T_m$.

17. The apparatus of claim 16 further comprising means to modify said voltage-frequency index so as to cause said motor speed to increase from a specific speed approximating a steady state speed during a start-up period.

18. The apparatus of claim 16 wherein said means to calculate motor speed, means for storing and reading electrical signals, means for monitoring a voltage-frequency index, means to calculate a required blower torque, means to calculate a developed motor torque, means to compare the required blower torque with the developed motor torque, and means to modify the voltage-frequency index of a variable frequency drive comprises either a microprocessor system or a digital signal processor.

19. A method of causing an impeller driven by an induction motor having a variable frequency drive to provide a specific fluid flow, comprising the steps of:

attaching a fluid impeller to an induction motor such that said fluid impeller is constrained to rotate with an angular velocity N equal to the angular velocity of said induction motor rotor;

monitoring a magnitude of said angular velocity N by reading an angular velocity electrical signal from a speed sensor;

maintaining an array of specific blower constant values $A_{2F}$, $A_{1F}$ and $A_{0F}$ as indexed by a selected fluid flow rate F;

maintaining an array of specific motor constant values $B_{2R}$, $B_{1R}$ and $B_{0R}$ as indexed by a voltage-frequency index R of said variable frequency drive;

calculating a required blower torque $T_b$ by multiplying a second entry $A_{2F}$ of said blower constant array for a selected flow rate F by the motor speed squared, $N^2$, to obtain a first blower result, multiplying a first array entry $A_{1F}$ of said blower constant array for a selected flow rate F by the motor speed N to obtain a second blower result, and adding said first blower result to said second blower result and to a zero$^{th}$ array entry $A_{0F}$ of said blower constant array for said selected flow rate F;

calculating a developed motor torque $T_m$ by multiplying a second entry $B_{2R}$ of said motor constant array for the voltage-frequency index R by the motor speed squared, $N^2$, to obtain a first motor result, multiplying a first array entry $B_{1R}$ of said motor constant array for the voltage-frequency index R by the motor speed N to obtain a second motor result, and adding said first motor result to said second motor result and to a zero$^{th}$ array entry $B_{0R}$ of said motor constant array for the voltage-frequency index R;

comparing said required blower torque $T_b$ to said developed motor torque $T_m$;

maintaining a constant voltage-frequency index R to said variable frequency drive if the required blower torque $T_b$ equals the delivered motor torque $T_m$;

modifying the voltage-frequency index R to said variable frequency drive to increase the delivered motor torque $T_m$ if the delivered motor torque $T_m$ is less than the required blower torque $T_b$;

modifying the voltage-frequency index R to said variable frequency drive to decrease the delivered motor torque $T_m$ if the delivered motor torque $T_m$ is greater than the required blower torque $T_b$; and repeating the steps of monitoring the angular velocity N, calculating the required blower torque $T_b$, calculating the developed motor torque $T_m$, comparing the delivered motor torque $T_m$ to the required blower torque $T_b$ and maintaining and modifying the voltage-frequency index R, thereby causing the values of delivered motor torque $T_m$ to converge with the required blower torque $T_b$.

20. The method of claim 19 further comprising the step of changing said voltage-frequency index during a start-up period to cause said motor speed to increase from zero to a specific speed approximating a steady state speed.

* * * * *